(12) United States Patent
Zhang (10) Patent No.: US 11,507,472 B2
(45) Date of Patent: Nov. 22, 2022

(54) METHODS, DEVICES AND COMPUTER PROGRAM PRODUCTS FOR DATA BACKUP AND RESTORATION

(71) Applicant: EMC IP Holding Company LLC, Hopkinton, MA (US)

(72) Inventor: Zhibin Zhang, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 474 days.

(21) Appl. No.: 16/558,097

(22) Filed: Aug. 31, 2019

(65) Prior Publication Data

US 2020/0341866 A1 Oct. 29, 2020

(30) Foreign Application Priority Data

Apr. 25, 2019 (CN) .......................... 201910340857.0

(51) Int. Cl.
*G06F 7/00* (2006.01)
*G06F 17/00* (2019.01)
*G06F 11/14* (2006.01)
*G06F 16/185* (2019.01)

(52) U.S. Cl.
CPC ........ *G06F 11/1469* (2013.01); *G06F 16/185* (2019.01); *G06F 2201/805* (2013.01)

(58) Field of Classification Search
None
See application file for complete search history.

(56) References Cited

U.S. PATENT DOCUMENTS

| 2010/0280994 A1* | 11/2010 | Radon ................. G06F 11/1451 707/644 |
| 2017/0083406 A1* | 3/2017 | Qi ........................ G06F 16/9027 |
| 2019/0065322 A1* | 2/2019 | Chakankar .......... G06F 11/1471 |

* cited by examiner

*Primary Examiner* — Tuan A Pham
(74) *Attorney, Agent, or Firm* — Chamberlain, Hrdlicka, White, Williams & Aughtry (57) ABSTRACT

Embodiments of the present disclosure provide methods, devices, and computer program products for data backup and restoration. The embodiments include generating an initial path tree based on a file to be backed up and a directory associated with the file, the initial path tree comprising at least one node for indicating any of a file and a directory; backing up the file and the directory in a backup space; and updating the initial path tree to obtain a file path tree, the updating comprising: recording a first offset and a second offset respectively in a first node and a second node in the initial path tree, the first node corresponding to the file and the second node corresponding to the directory, the first offset indicating a first position of the file in the backup space, and the second offset indicating a second position of a corresponding directory in the backup space.

8 Claims, 6 Drawing Sheets

METHODS, DEVICES AND COMPUTER PROGRAM PRODUCTS FOR DATA BACKUP AND RESTORATION

FIELD

Embodiments of the present disclosure generally relate to the field of computer, and more specifically, to methods, devices and computer program products for data backup and restoration.

BACKGROUND

In recent years, with development of the computer technology, people pay more and more attention to safety of data storage. Data backup has gradually becomes a common technology for ensuring data safety. As the data backed up by users grow even larger, it takes more time to restore data from the backup data.

SUMMARY

Embodiments of the present disclosure provide methods, devices and computer program products for data backup and restoration.

In a first aspect of the present disclosure, there is provided a method of data backup. The method comprises: generating an initial path tree based on a file to be backed up and at least one directory associated with the file, the initial path tree comprising at least one node for indicating any of a file and a directory; backing up the file and the at least one directory in a backup space; and updating the initial path tree to obtain a file path tree, the updating comprising: recording a first offset and a second offset respectively in a first node and a second node in the initial path tree, the first node corresponding to the file and the second node corresponding to the directory, the first offset indicating a first position of the file in the backup space, the second offset indicating a second position of a corresponding directory in the backup space; and recording the first offset in at least one upper-level node of the first node.

In a second aspect of the present disclosure, there is provided a method of data restoration. The method comprises: obtaining a file path tree, the file path tree comprising at least one directory node, the directory node recording at least an offset of a corresponding directory in a backup space and an offset of at least one file included in the corresponding directory in the backup space; determining, from the file path tree, a directory node corresponding to a path to be restored; determining at least one offset corresponding to the directory node; and restoring data corresponding to the path from the backup space based on the at least one determined offset.

In a third aspect of the present disclosure, there is provided a device for data backup. The device comprises: a processor; and at least one memory being coupled to the at least one processing unit and storing instructions for execution by the at least one processing unit, the instructions, when executed by the at least one processing unit, causing the device to perform acts comprising: generating an initial path tree based on a file to be backed up and at least one directory associated with the file, the initial path tree comprising at least one node for indicating any of a file and a directory; backing up the file and the at least one directory in a backup space; and updating the initial path tree to obtain a file path tree, the updating comprising: recording a first offset and a second offset respectively in a first node and a second node in the initial path tree, the first node corresponding to the file and the second node corresponding to the directory, the first offset indicating a first position of the file in the backup space, the second offset indicating a second position of a corresponding directory in the backup space; and recording the first offset in at least one upper-level node of the first node.

In a fourth aspect of the present disclosure, there is provided a device for data restoration. The device comprises: a processor; and at least one memory being coupled to the at least one processing unit and storing instructions for execution by the at least one processing unit, the instructions, when executed by the at least one processing unit, causing the device to perform acts comprising: obtaining a file path tree, the file path tree comprising at least one directory node, the directory node recording at least an offset of a corresponding directory in a backup space and an offset of at least one file included in the corresponding directory in the backup space; determining, from the file path tree, a directory node corresponding to a path to be restored; determining at least one offset corresponding to the directory node; and restoring data corresponding to the path from the backup space based on the at least one determined offset.

In a fifth aspect of the present disclosure, there is provided a computer program product. The computer program product is stored in a non-transitory computer storage medium and comprises machine-executable instructions which, when executed by a device, cause the device to perform to execute the method according to the first aspect of the present disclosure.

In a sixth aspect of the present disclosure, there is provided a computer program product. The computer program product is stored in a non-transitory computer storage medium and comprises machine-executable instructions which, when executed by a device, cause the device to perform the method according to the second aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, features, and advantages of example embodiments of the present disclosure will become more apparent from the following detailed description with reference to the accompanying drawings, in which the same reference symbols refer to the same elements in exemplary embodiments of the present disclosure.

DETAILED DESCRIPTION OF EMBODIMENTS

Preferred embodiments of the present disclosure will be described as follows in greater detail with reference to the drawings. Although preferred embodiments of the present disclosure are illustrated in the drawings, it is to be understood that the present disclosure described herein may be implemented in various manners, not limited to the embodiments illustrated herein. Rather, these embodiments are provided to make the present disclosure described herein clearer and more complete and convey the scope of the present disclosure described herein completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." Terms "a first", "a second" and others may denote different or identical objects. The following text may also contain other explicit or implicit definitions.

Figure 1A:
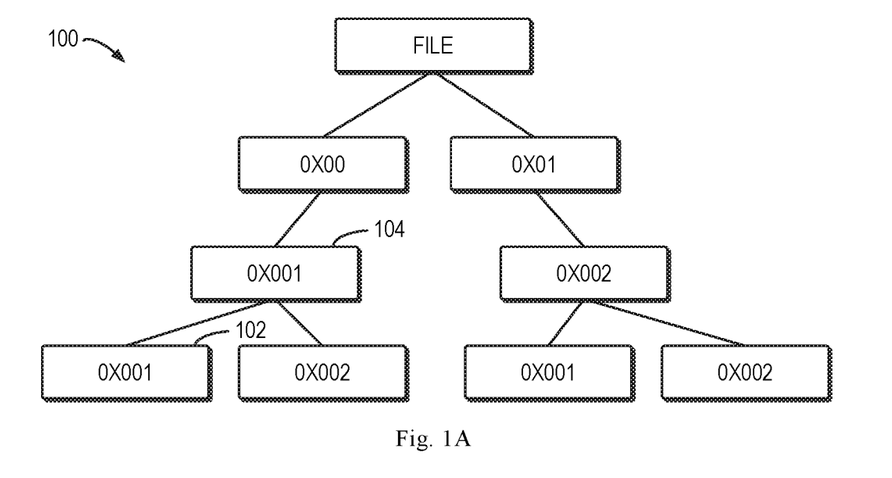
FIG. 1A illustrates an example file tree for data backup according to embodiments of the present disclosure.
Figure 1B:
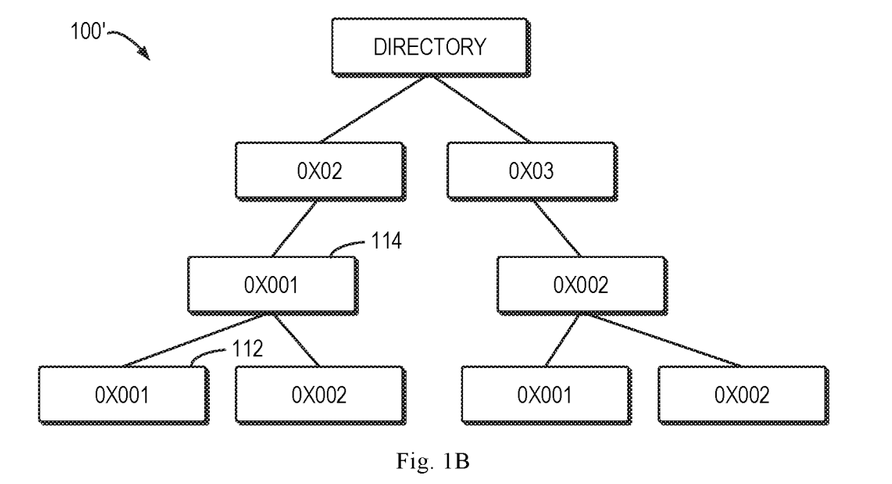
FIG. 1B illustrates an example directory tree for data backup according to embodiments of the present disclosure.

Data backup and restoration is an important mechanism for ensuring data safety. In a conventional index node-based data backup solution, all of the files can be organized into a file tree according to their index values. For example, FIG. 1A illustrates an example file tree 100 according to embodiments of the present disclosure. As shown in FIG. 1A, the file tree 100 may include one or more metadata nodes 102 for storing metadata of files, and one or more virtual nodes 104 facilitating searching of metadata corresponding to a file. In addition, all of the file directory pages can be organized into a directory tree according to their index values. For example, FIG. 1B illustrates an example director tree 100' according to embodiments of the present disclosure. As shown in FIG. 1B, the directory tree 100' may include one or more metadata nodes 112 for storing metadata of directories, and one or more virtual nodes 114 for facilitating searching of metadata corresponding to a directory. The virtual nodes 104 in the file tree 100 and the virtual nodes 114 in the directory tree 100' are all used for the purpose of logical organization, without including any real metadata.

In some conventional data restoration solutions, a data system typically determines, using an index value of a file, the file to be restored. However, when a user requests to restore all directories and files under a certain file path, the conventional solutions need additional time to determine all directories and files included under the path, and thus are ineffective in data restoration.

According to embodiments of the present disclosure, there is provided a solution of data backup and restoration. In the data backup solution, first, an initial path tree is generated based on files to be backed up and at least one directory associated with the files, wherein the initial path tree includes at least one node for indicating any of a file and a directory. Subsequently, the files and the at least one directory are backed up in a backup space, and the initial path tree is updated to obtain a file path tree. Specifically, the updating includes: recording a first offset and a second offset in a first node corresponding to the files and a second node corresponding to the directory in the initial path tree, respectively, wherein the first offset indicates a first position of the file in the backup space, and the second offset indicates a second position of a respective directory in the backup space, and the first offset is then recorded in at least one upper-level node of the first node. In this way, the embodiments of the present disclosure can store efficiently storage position information of respective backup files in the file path tree, thus facilitating rapid restoration of directories and files under a particular path.

Moreover, the data restoration solution includes first determining a directory associated with a file path to be restored and obtaining a file path tree. Then, the file path tree can be used to determine at least one offset corresponding to the directory, and further, the directory is restored from the backup space based on the at least one offset. In this way, the embodiments of the present disclosure can locate quickly in the backup space the position information of the respective directory under the particular path and files included therein, and can make use of the position information to restore rapidly and efficiently all directories and files under the path.

Figure 2:
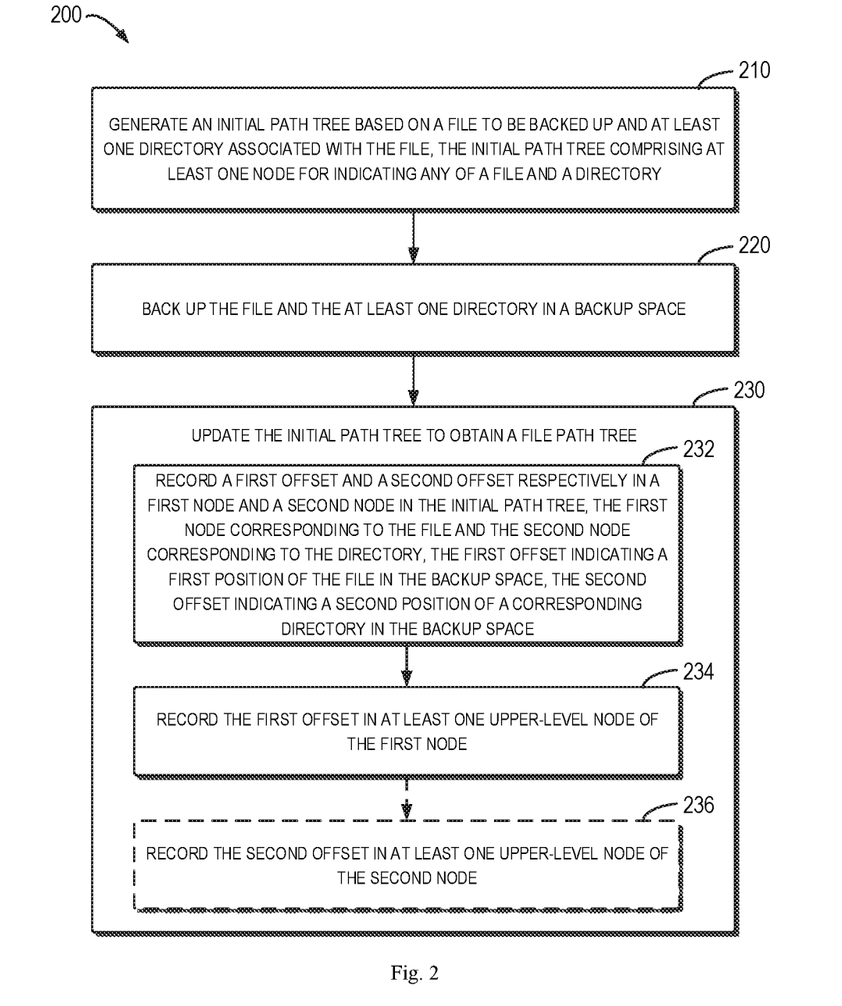
FIG. 2 illustrates a flowchart of a data backup process according to embodiments of the present disclosure.

The process of data backup according to embodiments of the present disclosure will be described below with reference to FIG. 2 to FIG. 6. FIG. 2 illustrates a flowchart of a process 200 of data backup according to some embodiments of the present disclosure. The process 200, for example, may be implemented by a backup system for executing data backup.

At block 210, the backup system generates an initial path tree based on a file to be backed up and at least one directory associated with the file, wherein the initial path tree comprises at least one node for indicating any of a file and a directory. Specifically, upon receiving a plurality of files to be backed up and an associated directory, the backup system may build an initial path tree based on the topology information stored in a root directory. It would be appreciated that the initial path tree built can only represent the topology structure of all of the files to be backed up and the directory, without including any metadata.

Figure 3:
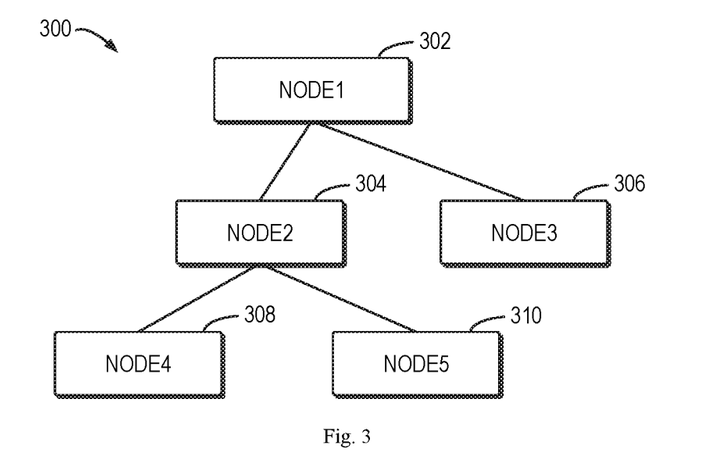
FIG. 3 illustrates a schematic diagram of an example initial path tree according to embodiments of the present disclosure.

For example, FIG. 3 illustrates an example initial path tree 300 according to embodiments of the present disclosure. As shown in FIG. 3, an initial path tree 300 may include one or more nodes (which are also referred to as "placeholder node") 302, 304, 306, 308 and 310. For example, the node 1 302 may correspond to a root directory of all files to be backed up, and the nodes 2 304 and 3 306 may correspond to two folders in the directory (for ease of description, which are referred to as "a first folder" and "a second folder" below), and the node 4 308 and node 5 310 may correspond to two files (for ease of description, which are referred to as "a first file" and "a second file" below) in the first folder. The backup system may obtain such topology information from the root directory to be backed up, and build correspondingly the initial path tree 300 as shown in FIG. 3.

Continuing to refer to FIG. 2, at block 220, the backup system backs up the files and the at least one directory in a backup space. Specifically, the backup system may write, into the backup space, the data corresponding to the files and the directory to be backed up. In some embodiments, the backup system may write the data corresponding to the directory (for example, information such as access time to the directory or the like) in an order in the backup data stream.

At block 230, the backup system updates the initial path tree to obtain a file path tree. Specifically, step 230 includes block 232 where the backup system records the first offset and the second offset at the first node corresponding to the file and the second node corresponding to the directory in the initial path tree, respectively, wherein the first offset indicates a first position of the file in the backup space, and a second offset indicates a second position of a respective directory in the backup space. The process of block 230 will be described with reference to FIG. 3 and FIG. 4, in which FIG. 4 illustrates an example file path tree according to embodiments of the present disclosure.

Figure 4:
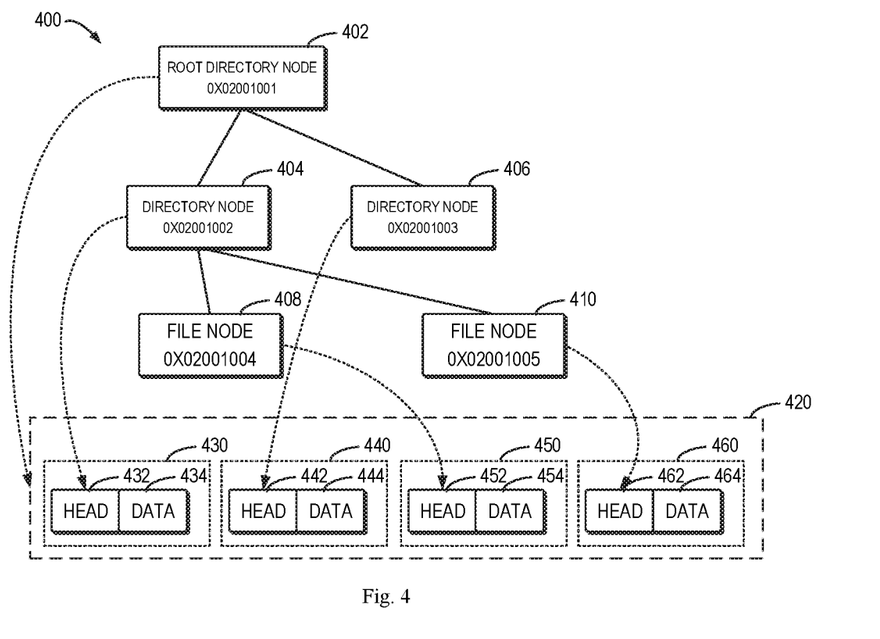
FIG. 4 illustrates a schematic diagram of an example file path tree according to embodiments of the present disclosure.

As shown in FIG. 4, all files and directories under the root directory are written into a backup space 420, and the backup space 420 further includes a plurality of slices 430, 440, 450 and 460. Each slice corresponds to any of a backed-up file and a backed-up directory, and each slice includes a head (432, 442, 452 and 462) and data (434, 444, 454 and 464). Wherein, the head (432, 442, 452 and 462) may store information, such as a length of the data (434, 444, 454 and 464) and the like, and the data (434, 444, 454 and 464) store the real data of the file and the directory that are backed up.

Continuing with the example of FIG. 3, the node 4 308 is taken an example of the first node. After completing writing data of the first file corresponding to the node 4 308 into the slice 450 in the backup space 420, the backup system may record, in the node 4 308, information indicating a first offset of the head 452 in the backup space 420, and the first offset may be used to determine the storage position of the first file in the backup space 420. Moreover, the backup system may record, in the node 4 308, an index value (0X02001004) thereof, for subsequent use in restoration of the first files based on the index value. In addition, the backup system may mark the node 4 308, into which the first offset has been written, as a file node, thereby obtaining a file node 408 as shown in FIG. 4. Based on the first offset stored in the file node 408, the backup system may locate quickly the position of the first file in the backup space 420.

In addition, the node 2 304 is taken as an example of the second node. After completing writing, into the slice 430 in the backup space 420, the data (for example, information such as access time to the directory and the like) of the directory (i.e., a first folder) corresponding to the node 2 304, the backup system may record, in the node 2 304, information indicating a second offset of the head 432 in the backup space 420, and the second offset may be used to determine the storage position of the backed-up directory (i.e., the first folder) in the backup space 420. Further, the backup system may also record an index value (0X02001002) of the directory (i.e., the first folder) in the node 4 304, for subsequent use in restoration of the first folder based on the index value. In addition, the backup system may mark the node 4 302, into which the second offset has been written, as a directory node, thereby obtaining a directory node 404 as shown in FIG. 4. Based on the offset information stored in the directory node 404, the backup system may quickly locate the position of the directory in the backup space 420.

Continuing to refer to FIG. 2, at block 234, the backup system records the first offset in at least one upper-level node of the first node. Next, referring to the example of FIG. 4, the backup system may update the first offset recorded in the file node 408 to at least one upper-level node thereof (for example, the directory node 2 304). As such, the directory node 404 may record simultaneously an offset of a slice 405 corresponding to a file in the directory, an offset of a slice 406 corresponding to a further file included in the directory, and a second offset of a slice 430 corresponding to the directory. In other words, in this way, the embodiments of the present disclosure may record efficiently, in a directory node, storage positions of all files included in the directory and a position where the information of the directory is stored, thereby facilitating a quick directory restoration.

In some embodiments, the backup system may write the first offset into all the upper-level nodes of the first node, such that file nodes corresponding to all upper-level directories of the file each include offset information of the file in the backup space. Alternatively, the backup system may write the first offset only into a parent node of the first node, and then write, after determining an offset of a slice corresponding to the parent node, offset information of all child nodes of the parent node into a further parent node of the parent node, thereby avoiding write confliction.

In some embodiments, the backup system may update offset information for the upper-level nodes after backup of the sibling nodes is completed. The process of block 234 will be described below with reference to FIG. 5 which illustrates a flowchart of a process of recording a first offset in at least one upper-level node according to embodiments of the present disclosure.

Figure 5:
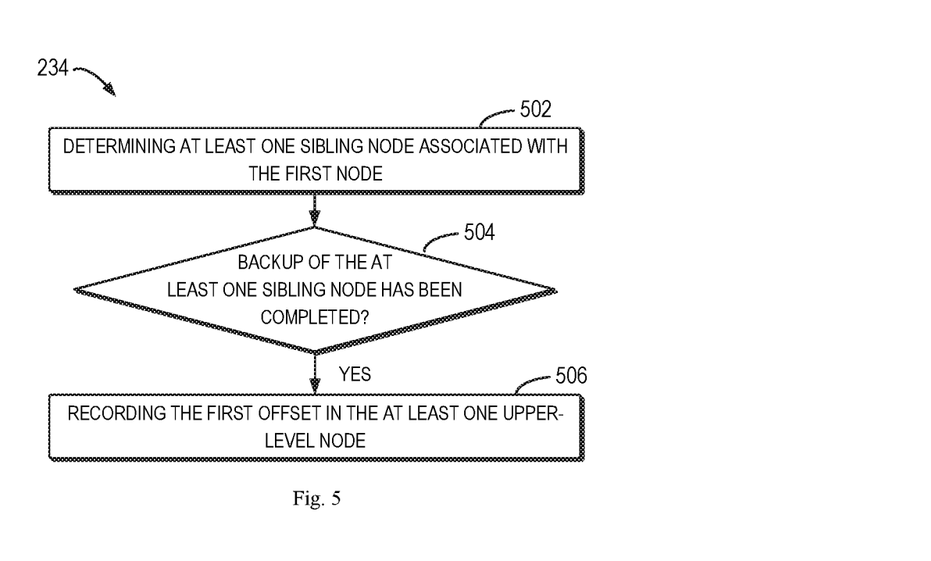
FIG. 5 illustrates a flowchart of a process of recording a first offset in at least an upper-level node according to embodiments of the present disclosure.

As shown in FIG. 5, at block 502, the backup system may determine at least one sibling node associated with the first node. Continuing with the example of FIG. 3, the backup system may determine that the sibling node of the first node 308 is a node 5 310.

At block 504, the backup system may determine whether at least one sibling node completes backup. The specific process of block 504 will be described with reference to FIG. 6 which illustrates a flowchart of determining whether a target sibling node completes backup according to embodiments of the present disclosure.

Figure 6:
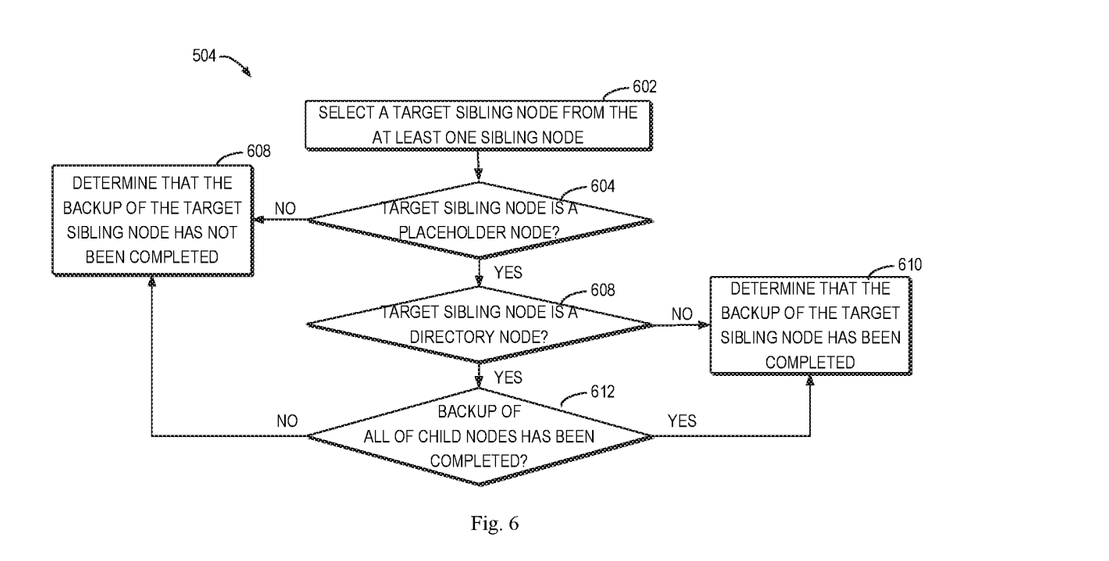
FIG. 6 illustrates a flowchart of a process of determining whether backup of a sibling node has been completed according to embodiments of the present disclosure.

As shown in FIG. 6, at block 602, the backup system may select, from at least one sibling node, a target sibling node to be determined. For example, in FIG. 3, the target sibling node may be node 5 310. At block 604, the backup system may determine whether the target sibling node is a placeholder node, and in response to determining at block 604 that the target sibling node is a placeholder node, the method proceeds to block 608, i.e., the backup system determines that the backup of the target sibling node has not been completed. Continuing with the example of FIG. 3, if the target sibling node 5 310 is not marked as a directory node or a file node, the backup system may determine that the backup of the target sibling node 5 310 has not been completed.

In response to determining at block 640 that the target sibling node is not a placeholder node, the method proceeds to block 608, i.e., the backup system determines whether the target sibling node is a directory node, and in response to determining at block 608 that the target sibling node is a file node, rather than a directory node, the method proceeds to block 610, i.e., the backup system determines that the backup of the target sibling node has been completed. Taking FIG. 4 as an example, the placeholder node 310 has been marked as a file node 410, and in this case, the file system may determine that the backup of the sibling node of the file node 408 has been completed.

In response to determining at block 608 that the target sibling node is a directory node, the method proceeds to block 612, i.e., the backup system determines whether the backup of all child nodes of the target sibling node has been completed. For example, when the child nodes of the target sibling node include a node, the backup system may determine that the backup of the target sibling node has not been completed. In turn, when the child nodes in the target sibling node only include the directory node and file nodes the backup of which is completed, or include no node, the backup system may determine that the backup of the target sibling node has been completed.

Continuing to refer to FIG. 5, in response to determining at block 504 that the backup of at least one sibling node has been completed, the method proceeds to block 506, i.e., the backup system may record the first offset in at least one upper-level node. In this way, the backup system may write offset information of slices corresponding to child nodes into the upper-level node after the backup of all nodes in the same tier have been completed, thus avoiding write confliction and improving the write efficiency.

Continuing to refer to FIG. 2, in addition or alternatively, the update step 230 may further include: at block 236, the backup system may record a second offset in at least one upper-level node of the second node. Similar to writing the first offset, in some embodiments, the backup system may write the second offset to all of the upper-level nods of the second node. Alternatively, the backup system may also write, into the parent node of the second node, the second offset and the offset information of child nodes that have been written into the second node, such that all the directory nodes can include the offset information of all files included in the directory by writing progressively, iteratively the offset information.

Figure 7:
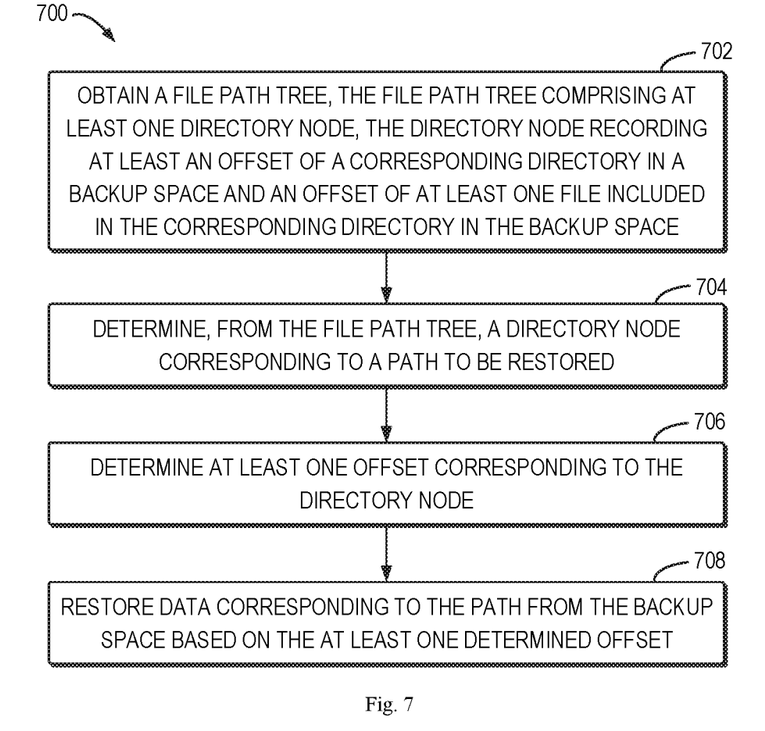
FIG. 7 illustrates a flowchart of a process of data restoration according to embodiments of the present disclosure.

The file path tree generated through the solution, as stated above, may be further applied to restoration of a directory under a particular path and all files included therein. The process of data restoration will be described below with reference to FIGS. 7-8. FIG. 7 illustrates a flowchart of a process 700 of data restoration according to embodiments of the present disclosure. The process 700, for example, may be executed by a restoration system for executing a data restoration process.

As shown in FIG. 7, at block 702, the restoration system may acquire the file path tree generated based on the process as described above, in which the file path tree includes at least one directory node which records at least an offset of a corresponding directory in the backup space and an offset of at least one file included in the corresponding directory in the backup space. In some embodiments, the restoration system may read, from a local or remote storage device, a prestored file path tree. As described above, taking FIG. 4 as an example, the file path tree may include the directory node 404 which records an offset of a first folder corresponding to the directory node 404 in the backup space 420, an offset of a first file included therein in the backup space 420, and an offset of a second file included therein in the backup space 420.

At block 704, the restoration system determines, from the file path tree, a node corresponding to a path to be restored. The file path tree 400 in FIG. 4 is taken as an example. For example, if the path that a user requests to restore is "root directory/first folder", the restoration system may determine, based on the file path tree 400, that the node corresponding to the path is a directory node 404.

At block 706, the restoration system determines at least one offset associated with a node. Continuing with the example of FIG. 4, when the determined directory node is 404, as discussed above, the directory node 404 records an offset of the slice 430 corresponding to the first folder in the backup space 420, an offset of the slice 440 corresponding to the first file included in the first folder in the backup space 420, and an offset of the slice 460 corresponding to the second file included in the first folder in the backup space 420. The restoration system may acquire rapidly the above offset information from the directory node 404.

At block 708, the backup system restores data corresponding to the path from the backup space based on the at least one determined offset. The execution process of block 708 will be described below with reference to FIG. 8 which illustrates a flowchart of a directory restoration process according to embodiments of the present disclosure.

Figure 8:
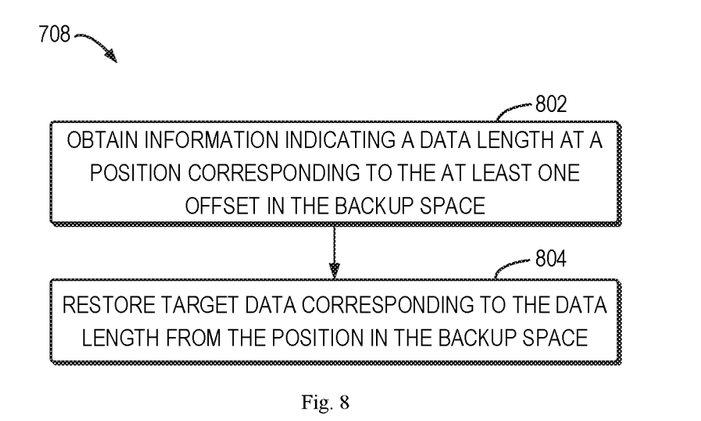
FIG. 8 illustrates a flowchart of a process of restoring a directory according to embodiments of the present disclosure.

As shown in FIG. 8, at block 802, the backup system acquires information indicating a data length at a position corresponding to at least one offset in a backup space. Continuing with the example of FIG. 4, subsequent to obtaining the offset of the slice 430 corresponding to the first folder in the backup space 420, the offset of the slice 440 corresponding to the first file included in the first folder in the backup space 420, and the offset of the slice 460 corresponding to the second file included in the first folder in the backup space 420, the backup system may access the head 432 of the slice 430, the head 452 of the slice 450 and the slide 462 of the slice 460. As described above, the head stores therein information indicating a data length of the corresponding slice. The backup system may further obtain information indicating data lengths of the slices 430, 450, 460, respectively.

At block 804, the backup system may restore target data corresponding to the data length from the position in the backup space. Continuing with the example of FIG. 4, after obtaining the offsets and the data lengths, the backup system may restore, from the backup space 420, the slice 430 corresponding to the first folder, the slice 450 corresponding to the first file and the slice 460 corresponding to the second file, and thus restore the folder information of the path "root directory/first folder" as well as the first file and the second file included therein.

Through the above solution, the embodiments of the present disclosure can quickly locate offsets of a folder and all files included in a path to be restored in a backup space, and further can restore rapidly the target data from the backup space, thereby improving significantly data restoration efficiency.

Figure 9:
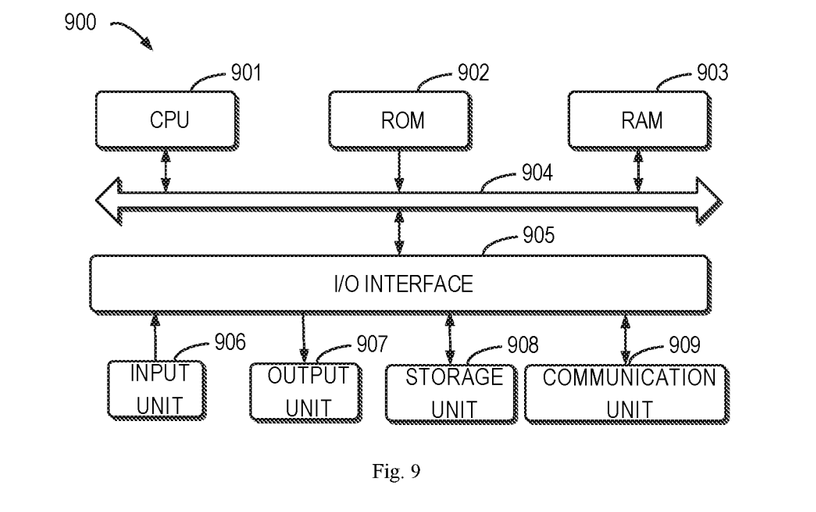
FIG. 9 illustrates a schematic block diagram of an example device that can be used to implement embodiments of the present disclosure.

FIG. 9 shows a schematic block diagram of an example device 900 that can be used to implement embodiments of the present disclosure. For example, the backup system and/or restoration system according to embodiments of the present disclosure can be implemented by device 900. As shown, device 900 includes a central processing unit (CPU) 901 that can perform various appropriate actions according to computer program instructions stored in read only memory (ROM) 902 or loaded from storage unit 908 into a random access memory (RAM) 903. In the RAM 903, various programs and data required for the operation of the device 900 can also be stored. The CPU 901, the ROM 902, and the RAM 903 are connected to each other through a bus 904. An input/output (I/O) interface 905 is also coupled to bus 904.

A plurality of components in device 900 are coupled to I/O interface 905, including: input unit 906, such as a keyboard, mouse, etc.; output unit 907, such as various types of displays, speakers, etc.; storage unit 908, such as a disk and an optical unit, etc.; and a communication unit 909 such as a network card, a modem, a wireless communication transceiver, and the like. Communication unit 909 allows device 900 to exchange information/data with other devices over a computer network such as the Internet and/or various telecommunication networks.

The various processes and processes described above, such as method 200 and/or method 700, may be performed by processing unit 901. For example, in some embodiments, method 200 and/or method 700 can be implemented as a computer software program that is tangibly embodied in a machine readable medium, such as storage unit 908. In some embodiments, some or the entire computer program may be loaded and/or installed onto device 900 via ROM 902 and/or communication unit 909. One or more actions of method 200 and/or method 700 described above may be performed when a computer program is loaded into RAM 903 and executed by CPU 901.

The present disclosure can be a method, device, system and/or computer product. The computer product can include a computer readable storage medium with computer readable program instructions for performing various aspects of the present disclosure thereon.

A computer readable storage medium may be a tangible device that can hold and store the instructions used by the instruction execution device. The computer readable storage medium can be, for example, but not limited to, an electrical storage device, a magnetic storage device, an optical storage device, an electromagnetic storage device, a semiconductor storage device, or any suitable combination of the foregoing. More specific examples (non-exhaustive list) of computer readable storage media include: portable computer disks, hard disks, random access memory (RAM), read only memory (ROM), erasable programmable read only memory (EPROM) or flash memory), static random access memory (SRAM), portable compact disk read only memory (CD-ROM), digital versatile disk (DVD), memory stick, floppy disk, mechanical encoding device, for example, the hole card with instructions stored thereon or raised structure in groove, and any suitable combination of the above. The computer readable storage medium as used herein is not to be interpreted as a transient signal itself, such as a radio wave or other freely propagating electromagnetic wave, an electromagnetic wave propagating through a waveguide or other transfer medium (e.g., a light pulse through a fiber optic cable), or the electrical signal transferred through a wire.

The computer readable program instructions described herein can be downloaded from a computer readable storage medium to various computing/processing devices, or downloaded to an external computer or external storage device over a network, such as the Internet, a local area network, a wide area network, and/or a wireless network. The network may include copper transfer cables, fiber optic transfers, wireless transfers, routers, firewalls, switches, gateway computers, and/or edge servers. A network adapter card or a network interface in each computing/processing device receives computer readable program instructions from the network and forwards the computer readable program instructions for storage in a computer readable storage medium in each computing/processing device.

Computer program instructions for performing the operations of the present disclosure may be assembly instructions, instruction set architecture (ISA) instructions, machine instructions, machine related instructions, microcode, firmware instructions, state setting data, source code or object code written or in any combination of one or more programming languages including object oriented programming languages, such as Smalltalk, C++ and so on, as well as conventional procedural programming languages, such as "C" language or similar programming language. The computer readable program instructions can be executed entirely on the user's computer, partly on the user's computer, as a stand-alone software package, partly on the user's computer and partly on the remote computer, or entirely on the remote computer or server. In the case of a remote computer, the remote computer can be connected to the user's computer through any kind of network, including a local area network (LAN) or wide area network (WAN), or can be connected to an external computer (e.g., using an Internet service provider to access the Internet connection). In some embodiments, the customized electronic circuit, such as a programmable logic circuit, a field programmable gate array (FPGA), or a programmable logic array (PLA), can be customized by utilizing state information of computer readable program instructions. The electronic circuit can execute computer readable program instructions to implement various aspects of the present disclosure.

Various aspects of the disclosure are described herein with reference to flowcharts and/or block diagrams of methods, devices (systems) and computer products according to embodiments of the present disclosure. It will be understood that each block of the flowchart illustrations and/or block diagrams, and combinations of blocks in the flowcharts and/or block diagrams can be implemented by computer readable program instructions.

These computer readable program instructions can be provided to a processing unit of a general purpose computer, a special purpose computer or other programmable data processing apparatus to produce a machine such that when the instructions are executed by processing unit via a computer or other programmable data processing apparatus, devices that implement the functions/acts specified in one or more of the flowcharts and/or block diagrams are produced. The computer readable program instructions can also be stored in a computer readable storage medium that causes the computer, programmable data processing device, and/or other device to operate in a particular manner, such that the computer readable medium storing the instructions includes an article of manufacture that includes instructions for implementing various aspects of the functions/acts recited in one or more blocks of the flowcharts and/or block diagrams.

Computer readable program instructions can also be loaded onto a computer, other programmable data processing device, or other device to perform a series of operational steps on a computer, other programmable data processing device or other device to produce a process that a computer is implemented such that instructions executed on a computer, other programmable data processing apparatus, or other device implement the functions/acts recited in one or more of the flowcharts and/or block diagrams.

The flowchart and block diagrams in the drawings illustrate the architecture, functionality, and operation of possible implementations of devices, methods, and computer products according to various embodiments of the present disclosure. In this regard, each block in the flowchart or block diagram can represent a module, a program segment, or a portion of an instruction, module, the program segment, or a portion of the instruction includes one or more executable instructions for implementing principles. In some alternative implementations, the functions noted in the blocks may also occur in a different order than those illustrated in the drawings. For example, two consecutive blocks may be executed substantially in parallel, and they may sometimes be executed in a reverse order, depending upon the functionality involved. It is also noted that each block of the block diagrams and/or flowcharts, and combinations of blocks in the block diagrams and/or flowcharts, can be implemented in a dedicated hardware-based system that performs the specified function or action of principle or can be implemented with a combination of dedicated hardware and computer instructions.

The embodiments of the present disclosure have been described above, and the foregoing description is illustrative, not limiting, and not limited to the disclosed embodiments. Numerous modifications and changes will be apparent to those skilled in the art without departing from the scope of the invention. The choice of terms used herein is intended to best explain the principles, practical applications, or technical improvements of the techniques on the market, or enable other ordinary technical staffs in the art to understand the embodiments in the disclosure.

I claim:

1. A method for data backup, comprising:
generating an initial path tree based on a file to be backed up and a directory associated with the file, the initial path tree comprising nodes corresponding to the file and the directory, wherein the nodes are arranged in a hierarchical structure;
backing up the file and the at least one directory in a backup space; and
updating the initial path tree after backing up the file and the at least one directory in the backup space to obtain a file path tree, the updating comprising:
storing a first offset in a first node of the initial file tree path and a second offset in a second node of the initial path tree, wherein the first node corresponds to the file and the second node corresponds to the directory, and wherein the first offset specifies a first position within the backup space in which the file is stored after the file is backed up in the backup space and the second offset specifies a second position within the backup space in which the directory is stored after the directory is backed up in the backup space, wherein storing the first offset in the first node and the second offset in the second node of the initial path tree comprises:
determining at least one sibling node associated with the first node;
determining whether backup of the at least one sibling node has been completed; and
in response to determining that the backup of the at least one sibling node has been completed, recording the first offset in at least one upper-level node;
storing another copy of the first offset in at the least one upper-level node of the first node, wherein the at least one upper-level node of the first node is a node in the hierarchical structure of the initial path tree that is higher in hierarchy than the first node; and
marking the first node a file node and the second node a directory node.

2. The method of claim 1, wherein determining whether the backup of the at least one sibling node has been completed comprises:
for a target sibling node in the at least one sibling node:
determining whether the target sibling node is marked as a directory node;
in response to determining that the target sibling node is a directory node, determining whether backup of all of child nodes of the target sibling node has been completed; and
in response to the backup of the all of the child nodes has been completed, determining that the backup of the target sibling node has been completed.

3. The method of claim 2, wherein determining whether the backup of the at least one sibling node has been completed comprises:
in response to determining that the sibling node is marked as a file node, determining that the backup of the target sibling node has been completed.

4. The method of claim 1, wherein updating the initial path tree further comprises:
storing another copy of the second offset in the at least one upper-level node of the second node, wherein the at least one upper-level node of the second node is a node in the hierarchical structure of the initial path tree that is higher in hierarchy than the second node.

5. A device for data backup, comprising:
at least one processing unit; and
at least one memory being coupled to the at least one processing unit and storing instructions for execution by the at least one processing unit, the instructions, when executed by the at least one processing unit, causing the device to perform acts comprising:
generating an initial path tree based on a file to be backed up and a directory associated with the file, the initial path tree comprising nodes corresponding to the file and the directory, wherein the nodes are arranged in a hierarchical structure;
backing up the file and the at least one directory in a backup space; and
updating the initial path tree after backing up the file and the at least one directory in the backup space to obtain a file path tree, the updating comprising:
storing a first offset in a first node of the initial file tree path and a second offset in a second node of the initial path tree, wherein the first node corresponds to the file and the second node corresponds to the directory, and wherein the first offset specifies a first position within the backup space in which the file is stored after the file is backed up in the backup space and the second offset specifies a second position within the backup space in which the directory is stored after the directory is backed up in the backup space, wherein storing the first offset in the first node and the second offset in the second node of the initial path tree comprises:
determining at least one sibling node associated with the first node;
determining whether backup of the at least one sibling node has been completed; and
in response to determining that the backup of the at least one sibling node has been completed, recording the first offset in the at least one upper-level node; and
storing another copy of the first offset in the at least one upper-level node of the first node, wherein the at least one upper-level node of the first node is a node in the hierarchical structure of the initial path tree that is higher in hierarchy than the first node; and
marking the first node a file node and the second node a directory node.

6. The device of claim 5, wherein determining whether the backup of the at least one sibling node has been completed comprises:
for a target sibling node in the at least one sibling node:
determining whether the target sibling node is marked as a directory node;

in response to determining that the target sibling node is a directory node, determining whether backup of all of child nodes of the target sibling node has been completed; and in response to the backup of the all of the child nodes has been completed, determining that the backup of the target sibling node has been completed.

7. The device of claim 6, wherein determining whether the backup of the at least one sibling node has been completed comprises:

in response to determining that the sibling node is marked as a file node, determining that the backup of the target sibling node has been completed.

8. The device of claim 5, wherein updating the initial path tree further comprises:

storing another copy of the second offset in the at least one upper-level node of the second node, wherein the at least one upper-level node of the second node is a node in the hierarchical structure of the initial path tree that is higher in hierarchy than the second node.

* * * * *